(No Model.)
C. W. HOIT.
Grafting Tool.
No. 229,040. Patented June 22, 1880.
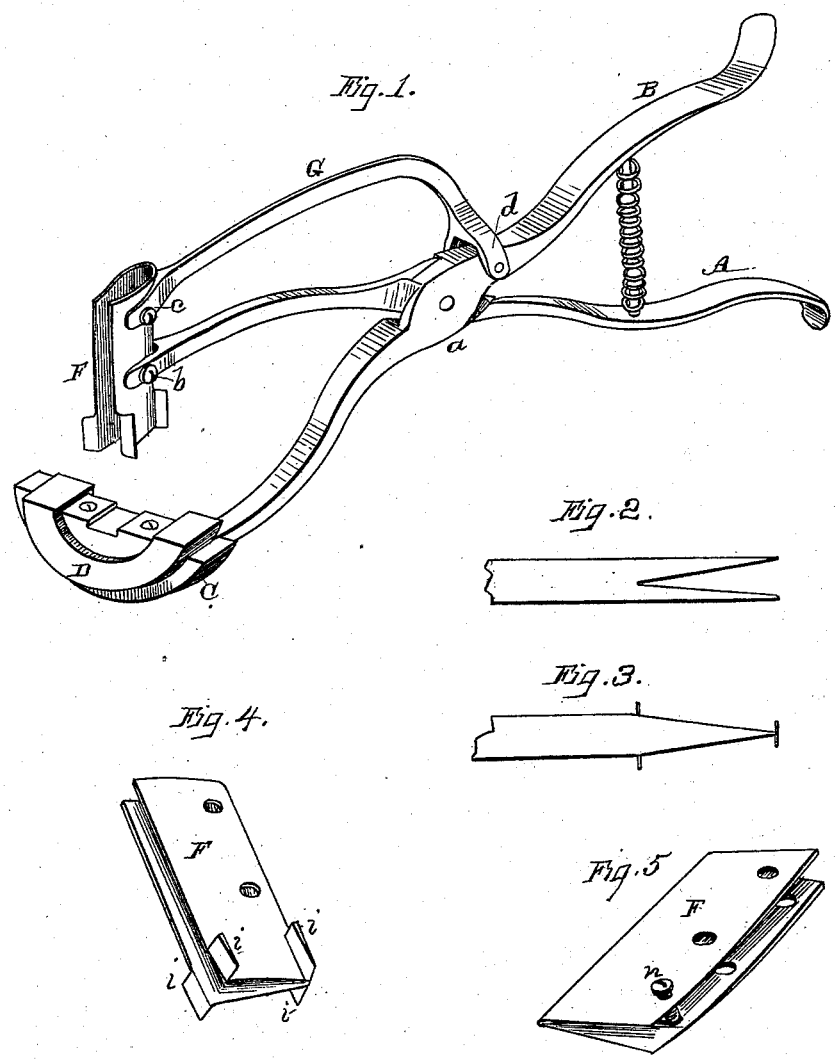
Witnesses
Frank A. Brooks
Geo. H. Strong
Inventor
Charles W. Hoit
By Dewey & Co.
Attys

UNITED STATES PATENT OFFICE.

CHARLES W. HOIT, OF PETALUMA, CALIFORNIA.

GRAFTING-TOOL.

SPECIFICATION forming part of Letters Patent No. 229,040, dated June 22, 1880.

Application filed April 17, 1880. (No model.)

*To all whom it may concern:*

Be it known that I, CHARLES W. HOIT, of Petaluma, county of Sonoma, and State of California, have invented an Improvement in Grafting-Tools; and I do hereby declare the following to be a full, clear, and exact description thereof.

My invention relates to certain improvements in that class of grafting implements in which the cutting-blades are adapted to be actuated by a hand implement; and it consists in the employment of a pair of pivoted handles, one of which is fitted to receive a curved wooden block or bed with an elastic surface, upon which the cutter acts, while the other operating-arm moves the cutter which is pivoted to it. The upper end of the cutter is also pivoted to the end of a supplemental arm, which extends back and unites with the handle upon the opposite side of the pivot, so as to produce a parallel motion of the cutter, which insures its making a straight clean cut whatever the thickness of the scion or stock to be operated upon.

The cutters are formed of steel plates so attached to the arms that the cut in the scion and the corresponding cut of the stock may be made with one tool, or different-shaped tools may be substituted by the removal of the holding-screws. The cutters have open centers, made wider at the top than at the bottom, to discharge the chips or cuttings.

Referring to the accompanying drawings for a more complete explanation of my invention, Figure 1 is a view of my implement. Fig. 2 shows the method of cutting the stock to receive the scion. Fig. 3 shows the method of cutting the scion. Figs. 4 and 5 are views of the cutter employed for the scion.

A B are the handles, pivoted together at *a*, so that their opposite ends form levers like shears in their action. The front end of one of the handles has a curved piece of metal, C, formed with or secured to it, with its concave side toward the opposite arm. Within this concave holder a semicircular block, D, is secured so that its upper surface is opposite the arm which carries the cutter. This surface is made concave, and is preferably covered with rubber or other elastic material to protect the edge of the cutter and the limb from injury.

The cutter F is formed by folding a piece of sheet-steel to the proper angle and sharpening the angular edge. The meeting edges of this cutter form a small curve rather than a short angle, and the plate projects a considerable distance above the sharpened edge, being also somewhat widened out, so as to form an open center, through which the chips will pass and escape without clogging. The sides of this cutter have holes made in them, one above the other.

The end of the arm A is fitted to hold the cutter, and is also perforated, and a rivet or screw, *b*, passes through the arm and the cutter-plate to hold it to the arm.

In cutting stocks and scions they will be found to be of different sizes, and it is preferable to have the knife or cutter move vertically in making its cut; but this cannot be accomplished with an ordinary hand-tool.

In order to make a vertical cut upon any sized limb, I cause the cutter to move in a vertical plane whatever the opening of the arms or handles may be. This is effected by means of an arm, G, which is secured to the cutter-plate extension at a point, *c*, above the attachment of the arm A, and extends above and parallel to the arm A to a point, *d*, at the rear of the pivot-pin *a* of the handles, where it is connected with the handle B.

It will be seen that when the handles are opened and closed the cutter-extension, which is pivoted to the handle A and to the arm G, will be held by these two arms, so as to form a parallel motion and rise and fall with its edge parallel with the face of the block D, and by this means it will bring the edge of the cutter down level upon the limb whatever its size. A screw, *n*, passes through one side of the cutter about three-eighths of an inch above the edge, and rests against the other side. This screw acts as a stay, and by turning it the two sides of the cutter may be separated or closed, so as to increase or diminish the angle of the cut.

The formation of my cutter is such that the cut in the stock and that in the scion may be made by the single knife, the outside of the blade cutting the groove in the stock, while the end of the scion is shaped by presenting it to the inside of the angle of the blade; but in many cases it will be found desirable to employ a different form of cutter for the scion, and this form is shown in Fig. 4.

In order to make the clean cut and sever the parts cut out when the limb or scion is large, I turn the edges of the cutter outward, as shown at $i$. These projecting lips extend out far enough to reach the outside diameter of the limb or scion, and thus, when the cut is made, as shown in Fig. 3, the chip will be severed at a single cut.

By this construction I am enabled to employ a single cutter operated by handles, and this cutter may be easily removed at any time for sharpening or to replace it by other forms, and I am enabled to make a perfectly vertical cut.

Having thus described my invention, what I claim as new, and desire to secure by Letters Patent, is—

1. In a grafting implement having a cutting-tool adapted to be actuated by the opening and closing of pivoted handles, the cutter formed of the single plate F, having its upper end or extension pivoted to the end of the handle A and to the arm G, the opposite end of said arm being also pivoted to the handle B behind the pivot $a$, whereby a parallel motion of the cutter is produced, substantially as herein described.

2. The cutter F, connected with the arms A and G, and provided with the adjusting screw or stay $n$, to operate as shown, in combination with the opposing arm B, with its curved extension C, and the removable block or table D, having the concave elastic surface, as shown, substantially as and for the purpose herein described.

3. The cutter F, formed with inclined blades having the flanges or extensions $i$, whereby the edges of the cut portion will be severed, substantially as and for the purpose herein described.

In witness whereof I have hereunto set my hand.

CHARLES W. HOIT.

Witnesses:
    D. D. HEMMENWAY,
    H. W. SILSBY.